United States Patent [19]

Pollock

[11] Patent Number: 5,651,892

[45] Date of Patent: Jul. 29, 1997

[54] BIODEGRADEABLE EFFLUENT NUTRIENT REMOVAL

[75] Inventor: David C. Pollock, Calgary, Canada

[73] Assignee: Deep Shaft Technology Inc., Calgary, Canada

[21] Appl. No.: 616,006

[22] Filed: Mar. 14, 1996

[51] Int. Cl.⁶ .................................................. C02F 3/30
[52] U.S. Cl. .......................... 210/605; 210/622; 210/624; 210/903; 210/629
[58] Field of Search .......................... 210/605, 622, 210/624, 626, 630, 629, 903, 906

[56] References Cited

U.S. PATENT DOCUMENTS

| | | | |
|---|---|---|---|
| 3,957,632 | 5/1976 | Knopp et al. | 210/903 |
| 3,964,998 | 6/1976 | Barnard | 210/605 |
| 4,425,231 | 1/1984 | Fujimoto et al. | 210/629 |
| 4,780,208 | 10/1988 | Böhnke et al. | 210/903 |
| 5,022,993 | 6/1991 | Williamson | 210/605 |
| 5,098,572 | 3/1992 | Faup et al. | 210/906 |
| 5,252,214 | 10/1993 | Lorenz et al. | 210/622 |
| 5,290,451 | 3/1994 | Koster et al. | 210/630 |
| 5,342,522 | 8/1994 | Marsman et al. | 210/605 |
| 5,518,618 | 5/1996 | Mulder et al. | 210/605 |
| 5,531,896 | 7/1996 | Tambo et al. | 210/605 |

Primary Examiner—Christopher Upton
Attorney, Agent, or Firm—Cushman Darby & Cushman IP Group of Pillsbury Madison & Sutro LLP

[57] ABSTRACT

A method of treating municipal or industrial wastewater containing undesired concentrations of ammonium or nitrate ions comprising treating the wastewater under anoxic, denitrifying conditions with denitrifying bacteria to reduce the concentration of nitrate ion and produce nitrogen gas and a denitrified liquor; treating the denitrified liquor in an aerobic vertical shaft bioreactor with an oxygen-containing gas to effect BOD removal by the bioxidation of organic compounds in the denitried liquor and produce carbon dioxide off-gas and a shaft bioreactor effluent liquor; clarifying a first portion of the shaft bioreactor effluent liquor to provide a first clarified liquor and a second portion of the shaft bioreactor effluent liquor to provide a second clarified liquor; treating the first clarified liquor under aerobic, nitrifying conditions with nitrifying bacteria, an oxygen-containing gas and the off-gas to oxidize ammonium ion to nitrate ion and provide a first nitrified liquor; recycling by adding the first nitrified liquor to the wastewater under step (a); treating the second clarified liquor under aerobic, nitrifying conditions with nitrifying bacteria, an oxygen-containing gas to oxidize ammonium ion to nitrate ion and provide a second nitrified liquor; and removing the said nitrified liquor as plant effluent.

5 Claims, 4 Drawing Sheets

BIODEGRADEABLE EFFLUENT NUTRIENT REMOVAL

FIELD OF THE INVENTION

This invention relates to apparatus and processes for treating municipal or industrial wastewater influent utilizing Biological Nutrient Removal, wherein the influent recycles through anoxic denitrification, vertical shaft BOD removal, flotation clarification and aerobic nitrification zones.

BACKGROUND TO THE INVENTION

In recent years, the removal of nitrogen and phosphorous from treated wastewater has become increasingly important because of the eutropification of natural water courses. In basic terms nitrogen removal is accomplished by converting ammonia contained in the mixed liquor stream to nitrites and nitrates, in the presence of oxygen and known as an aerobic nitrifying stage. Ammonia conversion to nitrite is carried out by microbes known as Nitrosomonas, while the conversion of nitrite to nitrate is accomplished by Nitrobacters.

Nitrate conversion to nitrogen gas occurs in an anoxic denitrifying stage that takes place in a suspended growth environment and is devoid of dissolved oxygen. Nitrogen, carbon dioxide and water is produced, with the gas being vented from the system.

Nitrification rates can be optimized by regulating interdependent waste stream parameters such as temperature, dissolved oxygen levels (D.O.), pH, solids retention time (SRT), ammonia concentration and BOD/TKN ratio (Total Kjeldahl Nitrogen, or TKN, is organic nitrogen plus the nitrogen from ammonia and ammonium). Higher temperatures and higher dissolved oxygen levels tend to promote increased nitrification rates, as does pH levels in 7.0 to 8.0 range. Sludge retention times of from 3½ to 5 days dramatically increase nitrification efficiency, after which time efficiencies tend to remain constant.

Increases in ammonia concentration increases the nitrification rate but only to a maximum level attainable after which further ammonia concentration increases do less to increase the rate of nitrification. Rates have also been shown to be maximized at BOD/TKN ratios of less than 1.0.

Physical/Chemical phosphorous removal as can be achieved by the addition of lime, alum or iron salts. Biological phosphorous removal requires an anaerobic suspended growth zone at the start of the system, and a sludge fermentation tank to supply volatile fatty acids (VFA's) for the energy needs of the phosphorous ingesting organisms (Acinetobacters).

Autotrophic organisms are those that utilize energy from inorganic material and include the nitrifiers Nitrosomonas and Nitrobacters. Heterotrophs utilize organic energy sources and include the aerobic BOD removers and the Acinetobacter biological phosphorous removers (Bio-P organisms).

Refractory treatment and polishing stages may be added to the process, downstream of the final clarification stage. In many waste streams, the majority of organic compounds (80%–90%) are easily biodegraded. The remaining fraction biodegrade more slowly and are termed "refractory" compounds. Prior art biological nutrient removal designs incorporate a single sludge and a single clarifier, for example, U.S. Pat. No. 3,964,998 to Barnard, but in that case the overall oxidation rate of the system has to be reduced to satisfy the slowest compound to oxidize.

Biological nutrient removal (BNR) systems can take various process configurations. One such embodiment is the five stage Modified Bardenpho™ process, which is based upon U.S. Pat. No. 3,964,998 to Barnard. It provides anaerobic, anoxic and aerobic stages for removal of phosphorous, nitrogen and organic carbon. More than 24 Bardenpho™ treatment plants are operational, with most using the five stage process as opposed to the previously designed four stage process. Most of these facilities require supplemental chemical addition to meet effluent phosphorous limits of less than 1.0 mg/L. Plants using this process employ various aeration methods, tank configurations, pumping equipment and sludge handling methods. WEF Manual of Practice No. 8, "Design of Municipal Wastewater Treatment Plants", Vol. 2, 1991.

The specific purpose of each of the bioreactor zones of the modified Bardenpho process is as follows:

Anaerobic Zone A—selector zone to allow Acinetobacteria (known as Bio-P organisms) to internally store organic carbon derived from pre-fermented sludge (volatile fatty acids, or VFA's) for later use as an energy source in the aeration zone, where the Bio-P bacteria commence to take up phosphorous. There is no nitrate or dissolved oxygen in this zone.

First Anoxic Zone $B_1$—reactor in which the nitrate present in the recycle flow from the aerobic zone is biochemically reduced to nitrogen gas (denitrification) in the presence of sufficient organic carbon to ensure rapid reaction rates.

First Aerobic Zone $C_1$—organic carbon (BOD) is oxidized to carbon dioxide, ammonia nitrogen is oxidized to nitrate (nitrification) and the Bio-P organisms utilize the carbon that was stored in the anaerobic zone to take in large amounts of phosphate and store it internally. The phosphate is subsequently extracted from the system by wasting the sludge in which it is contained.

Second Anoxic Zone $B_2$—reactor in which the nitrate not recycled to the first anoxic zone is converted to nitrogen gas (denitrification) but at slower rates due to lower levels of remaining organic carbon.

Second Aerobic Zone $C_2$—reactor to which air is added to prevent significant continuing nitrate conversion to nitrogen gas (denitrification) in the final clarifier D, which would hinder solids settlement.

By optionally wasting some solids from the first aerobic Zone $C_1$, phosphate that was taken up by the Bio-P organisms is removed from the system and may be put to beneficial use, such as soil additives.

The presence of sufficient low molecular weight organic carbon compounds entering the anaerobic zone allows the use of a smaller zone, and ensures a more uniform effluent concentration of phosphate. This may be achieved by fermentation of primary sludge with the subsequent supernatant added to the anaerobic zone as a source of VFA's for the Bio-P organisms. The second anoxic zone and the second anoxic zone is correct, and if sufficient low molecular weight organic carbon is available to the anaerobic zone. Oldham, W. K., "Biological Nutrient Removal from Wastewater—The Canadian Experience", The Canadian Civil Engineer, Vol. 10, No. 9, November 1993.

The control parameters include the following:

Aeration Control: Colder influent temperatures require higher dissolved oxygen levels to encourage nitrification, but over-aeration results in the discharge of excess D.O. in the mixed liquor recycle line from the aerobic Zone $C_1$ to the anoxic Zone $B_1$, which will then require more carbon to maintain effective nitrogen dissolution rates. Since available carbon levels may be limited, insufficient denitrification may result, as well as impaired phosphorous removal.

Nitrification Control: Nitrification is controlled by varying the D.O. levels in the aerated nitrifying zone (the higher the D.O., the higher the nitrifying rate) or by varying the solids retention time (SRT) in this zone. SRT is controlled by varying the volume of mixed liquor wasted from the nitrifying tank. SRT should be reduced for higher temperature influents and increased for lower temperature flow. Nitrifying organisms are very sensitive to toxins, which may inhibit nitrification. Mixed liquor wasting should be commenced if this condition is evident.

Denitrification Control: The source of the organic carbon required for denitrification is the influent wastewater. If nitrate levels are too high in the effluent stream, it is indicative of insufficient carbon levels, or too much dissolved oxygen is being recycled to the anoxic zone. Carbon levels may be increased by adding more volatile fatty acids to the anaerobic zone. Under normal operating conditions ammonia in the effluent should be less than 1 mg/L, and the nitrates should be less than 2 mg/L. Over aeration may increase nitrates while under-aeration may increase ammonia.

Sludge Fermentation Control: Upstream sludge fermentation tanks thicken the sludge and generate VFA's required in the anaerobic zone. Primary sludge is retained in the tanks to allow acid fermentation, but retention time is limited to prevent methane production which is detrimental to biological phosphorous removal. Leslie, P. J., "Westbank Wastewater Treatment Plant—A Case History", Western Canada Water and Wastewater Association Biological Nutrient Removal Seminar, November 1993.

Unfortunately, the Modified Bardenpho process requires an overly large, capital intensive treatment plant having significant operating expenses to minimize operational difficulties. Accordingly, there is a need for an efficacious biological nutrient removal system that requires less operational control and capital cost.

SUMMARY OF THE INVENTION

In one aspect the invention provides a method of treating municipal or industrial wastewater containing undesired concentrations of ammonium or, nitrate ions said process comprising:

(a) treating said wastewater under anoxic, denitrifying conditions with denitrifying bacteria to reduce the concentration of nitrate ion and produce nitrogen gas and a denitrified liquor;

(b) treating said denitrified liquor in an aerobic vertical shaft bioreactor with an oxygen-containing gas to effect BOD removal by the bioxidation of organic compounds in said denitrified liquor and produce carbon dioxide off-gas and a shaft bioreactor effluent liquor; clarifying a first portion of said shaft bioreactor effluent liquor to provide a first clarified liquor and a second portion of said shaft bioreactor effluent liquor to provide a second clarified liquor;

(c) treating said first clarified liquor under aerobic, nitrifying conditions with nitrifying bacteria, an oxygen-containing gas and said off-gas to oxidize ammonium ion to nitrate ion and provide a first nitrified liquor;

(d) recycling by adding said first nitrified liquor to said wastewater under step (a);

(e) treating said second clarified liquor under aerobic, nitrifying conditions with nitrifying bacteria, an oxygen-containing gas to oxidize ammonium ion to nitrate ion and provide a second nitrified liquor;

(f) removing said second nitrified liquor as plant effluent.

Preferably, the invention process further comprises a process as hereinbefore defined further comprising (g) treating raw wastewater influent under anaerobic fermentation conditions with volatile fatty acid-forming bacteria to produce a volatile fatty acid-containing liquor;

treating said volatile fatty acid-containing liquor with phosphate-fixing bacteria to provide a phosphate-fixed liquor; and treating said phosphate-fixed liquor under step (a).

More preferably, the invention process further comprises a process as hereinbefore defined further comprising feeding a second portion of said activated sludge as returns activated sludge to said anaerobic fermentation conditions under step (g).

The present invention has preferably a second activated sludge polishing step to help compensate for the different oxidation rates. Depending on influent characteristics and effluent quality requirements, this embodiment of the invention incorporates nutrient polishing and refractory treatment stages to the clarified wastewater downstream of the final clarifier. The four stages of the biological nutrient polishing and refractory treatment embodiment include, in series, i) an aerobic attached growth nitrifying filter, ii) an anoxic suspended growth denitrification tank, iii) a U.V. disinfectant stage and iv) a re-aeration zone after which the treated effluent is ready for discharge.

Ammonia nitrification is accomplished at much slower rates than, for example, the bio-oxidation of carbohydrates. Refractory compounds are most efficiently treated on attached growth bio-filters when total suspended solids (TSS) and bio-chemical oxygen demand (BOD) levels are low. The basis of the biological nutrient and refractory compound polishing stage is to initially have as much as the TSS and BOD removed at the highest rate and the shortest time possible in the vertical shaft and clarifiers. This functions as a buffer after which refractories that remain in the effluent stream are biodegraded on the attached growth bio-filters after final clarification. The performance of the refractory bio-filters is greatly enhanced due to the upstream shock-load protection of the vertical shaft and the relatively low TSS and BOD loading on the filters. The utilization of the refractory bio-filters in this configuration is well suited to the treatment of refractory compounds due to the long sludge age of the filter and high equivalent mixed liquor concentration. High quality effluents may now be achieved to satisfy the most stringent criteria, such as is set forth in California Title 22 Guidelines for example.

The attached growth nitrifying bio-filters allow nitrifying organisms to grow on submerged inert support media, such as expanded shale typically having a grain size of approximately 6 mm. The nitrifying filters require an upward flow of oxygen containing gas to stimulate the bed and aerate the bio-mass. This flow can be provided by the pressurized head tank off-gas (containing inorganic carbon, VOC's and $NH_3$) from the vertical shaft bio-reactor. In some cases the oxidation of ammonia to nitrate will require more oxygen than can be supplied by the vertical shaft. A supplemental low pressure process blower would be required for these applications. The filter bed will accumulate bio-mass in the interstitial spaces of the nitrification filter media and will occasionally require backwash scouring. A 6–10 pounds per square inch air scour used in conjunction with clarified effluent backwash water is utilized for this purpose. The backwash water is held in a pressurized holding tank, and as high pressure air/water backwash proceeds, blockage material will rise to the top of the filter and collect in an overflow trough to be recycled back to the vertical shaft.

In summary, the vertical shaft enhances the performance of the aerobic flooded bio-filters by transferring large amounts of oxygen and efficiently removing degraded organics. Without the vertical shaft, the rapid bio-degradation of BOD would lead to high sludge production which would clog the filters quickly. The vertical shaft does not favor slower growing organisms to develop in the process due to the dominance of BOD removal microbes, while the attached growth feature of the flooded filter allows acclimatized microbes to build up on the media over long periods, thus improving bio-degradation of refractory compounds and nitrification of ammonia.

BRIEF DESCRIPTION OF THE DRAWINGS

In order that the invention may be better understood preferred embodiments will now be described by way of example only with reference to the accompanying drawings wherein.

DETAILED DESCRIPTION OF PREFERRED EMBODIMENTS

Figure 1:
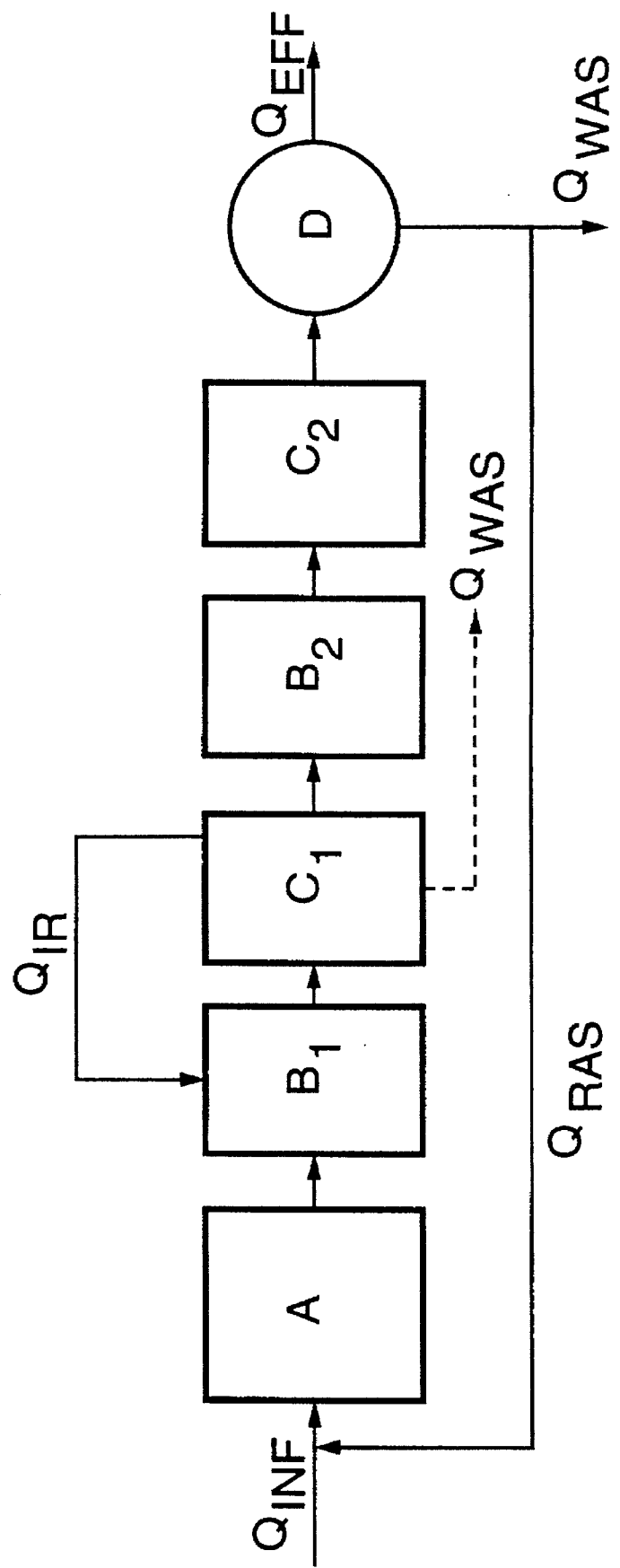
FIG. 1 is a schematic flow diagram of a prior art Bardenpho™ process.

FIG. 1 represents a schematic flow diagram of a prior art Bardenpho process wherein bioreactor zones A, $B_1$, $B_2$, $C_1$, $C_2$, and D and their purpose are as hereinbefore described.

The liquor flows shown in the drawings represent the following:

$Q_{INF}$ is raw influent, $Q_{RAS}$ is return activated sludge, $Q_{EFF}$ is effluent flow, $Q_{WAS}$ is waste activated sludge and $Q_{IR}$ represent internal recycle.

Figure 2:
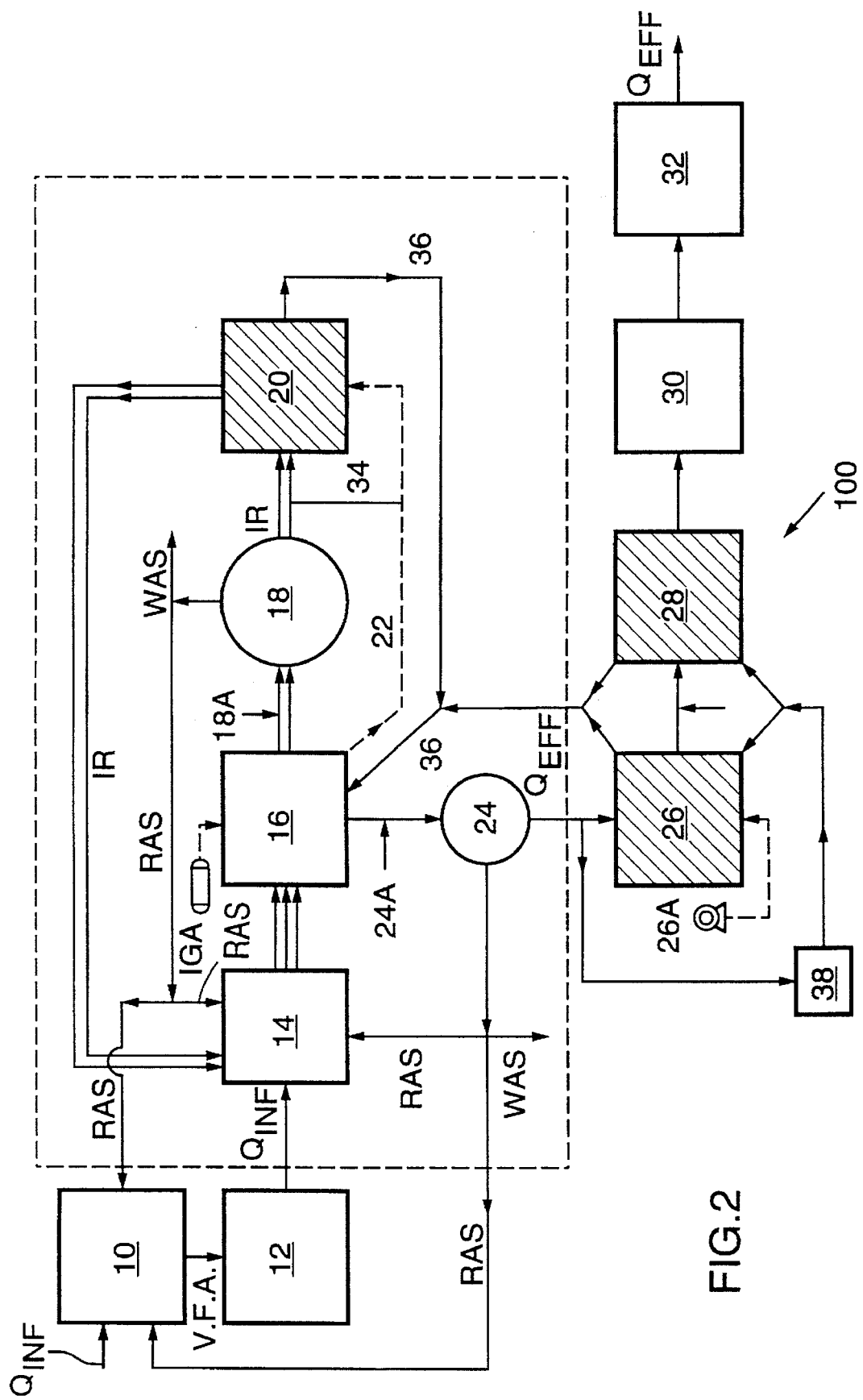
FIG. 2 is a schematic flow diagram of an embodiment according to the present invention, including alternate embodiments.

Reference is now made to FIG. 2 wherein screened and de-gritted raw influent enters the system, shown generally as 100, at an anaerobic sludge fermentation tank 10, from which process a supernatant containing volatile fatty acids (VFA's) from sludge fermentation is added to anaerobic vessel 12. Steps 10 and 12 may be optionally combined in one vessel. The VFA's come into contact with phosphate removing bacteria (Acinetobacters, or Bio-P organisms) and provide the acetate which is absorbed as stored energy by the organisms for later utilization in the uptake of phosphorous in the aerobic zones. The influent from vessel 12 is transferred to the anoxic denitrification zone 14, which also may serve as a system holding tank. Denitrification tank 14 receives fermented influent, return activated sludge (RAS) as hereinafter described, and VFA's from tank 12. Approximately 1.5–2.0 volumes of internal (nitrified) recycle IR, containing nitrate from downstream nitrifying filters is required for each volume of raw influent to denitrify domestic sewage down to approximately 2.0–5.0 mg/L total nitrogen (TN) in first stage 14. Denitrified nitrogen is liberated in tank 14 as nitrogen gas ($N_2$). Should the denitrifying bacteria have insufficient bio-chemical oxygen demand (BOD) as the carbon source, methanol may be added as a source of inorganic carbon but this would usually only happen at the polishing stage. Suspended growth tank 14 has variable volume and retention time depending on the liquid depth selected, and contents are mixed with a mechanical mixer.

The mixed liquor from vessel 14 is passed to aerobic vertical shaft 16 for BOD removal, as described for example in U.S. Pat. No. 4,272,379 to Pollock, wherein organic compounds are bioxidized. Air for the bioxidation reaction is supplied by high pressure compressor 16A, and is also used to circulate the contents of vertical shaft 16 by air lift.

From vertical shaft 16, effluent flows to a first clarifier 18. The sludge blanket in clarifier 18 contains Bio-P organisms that absorbed phosphorous in the aerobic zone, and since this stream is rich in phosphate, some may be wasted to serve as the principal mechanism for phosphate removal. Occasionally waste sludge may also optionally be withdrawn from the bottom of flotation tank clarifier 18.

From this point, clarified effluent flows to aerobic nitrifying filters 20 for roughing treatment, where ammonia is converted to nitrate in the presence of oxygen, i.e. nitrification. Attached growth flooded bio-filters 20 are aerated by utilizing the off-gas stream in conduit 22 from the pressurized head tank (not shown) of vertical shaft 16, which gas has relatively high $CO_2$ content (6–8% $CO_2$) and is a source of inorganic carbon required for cell synthesis by the nitrifying bacteria in biofilters 20. The filters also to serve to treat the volatile organic compounds (VOC's) and foam in the off-gas stream through the process of oxidation as well as the conversion of $H_2S$ to $SO_4$ and the release of $O_2$ and $N_2$ gas.

From biofilter 20, two volumes of nitrified stream are fed by IR back to anoxic denitrification stage 14 to effect further nitrogen dissolution to complete the first internal recycle IR, wherein it mixes with one volume of raw influent. After two recycle completions, the effluent is returned to vertical shaft 16 for final BOD oxidation and D.O. entrainment, and then to a final clarifier 24. If required, polymers may be added through conduit 24A to the stream before entrance to clarifier 24 to assist in bio-mass flotation. Returns activated sludge (RAS) may by recycled to anoxic denitrification tank 14, as feed stock to anaerobic fermentation tank 10, or wasted.

At this point, clarified effluent from final clarifier 24 flows to a biological nutrient polishing stage (refractory compound treatment). The effluent first flows to an aerobic nitrifying filter 26 for nitrification polish, which utilizes fine bubble aeration on the attached growth fixed media to further remove any residual ammonia fraction and create nitrates. Aeration in filter 26 is provided by a supplemental low pressure process blower 26A. Alum can then be added for additional phosphorous precipitation in anoxic denitrification polishing filter 28, which is also an attached growth fixed media filter. The effluent is then U.V. disinfected at 30 for pathogen control and re-aerated in aeration tank 32 to restore dissolved oxygen levels that are requisite in a high quality effluent discharge.

Figure 3:
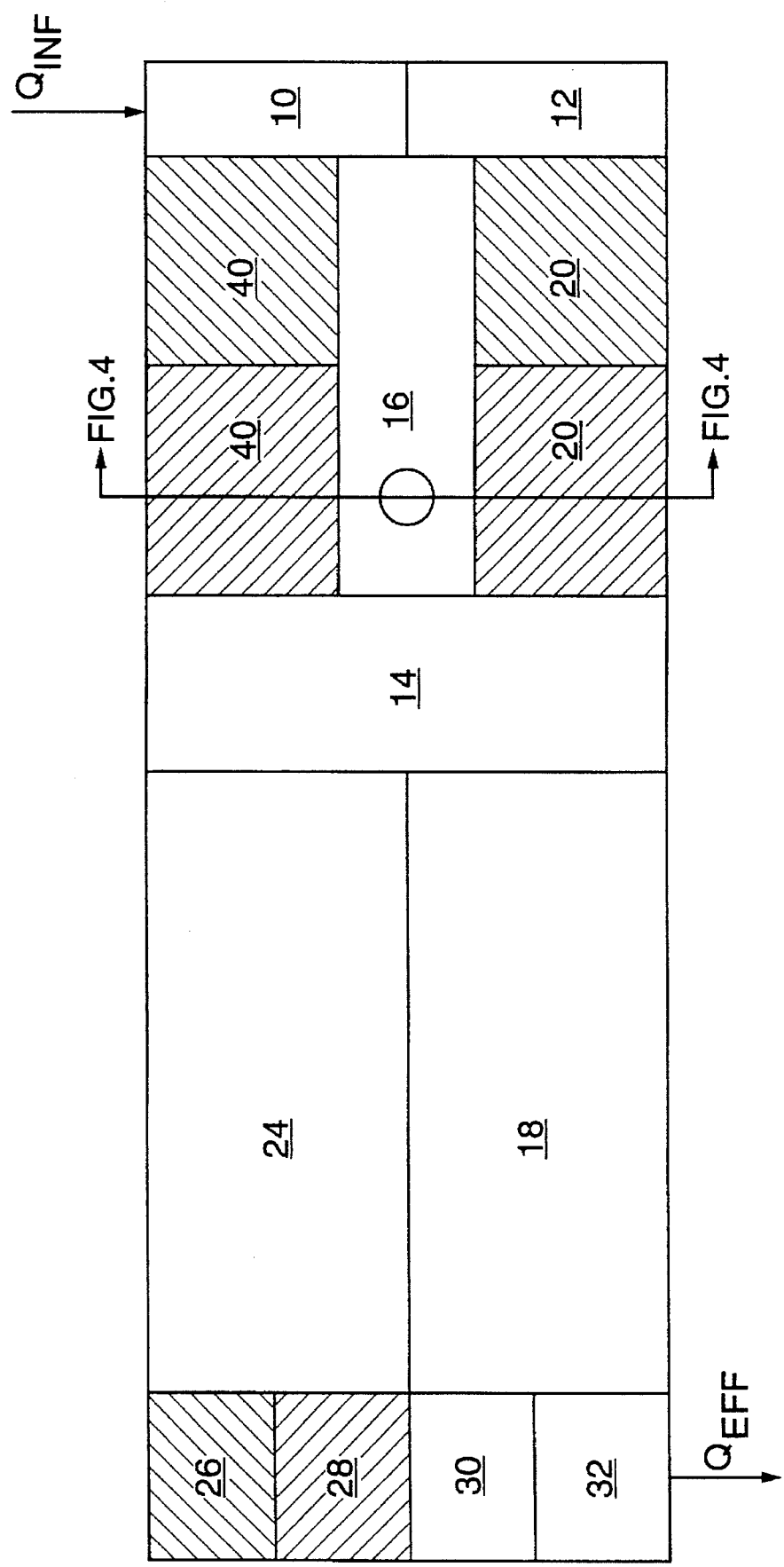
FIG. 3 is a simplified plan view of the layout of process elements.
Figure 4:
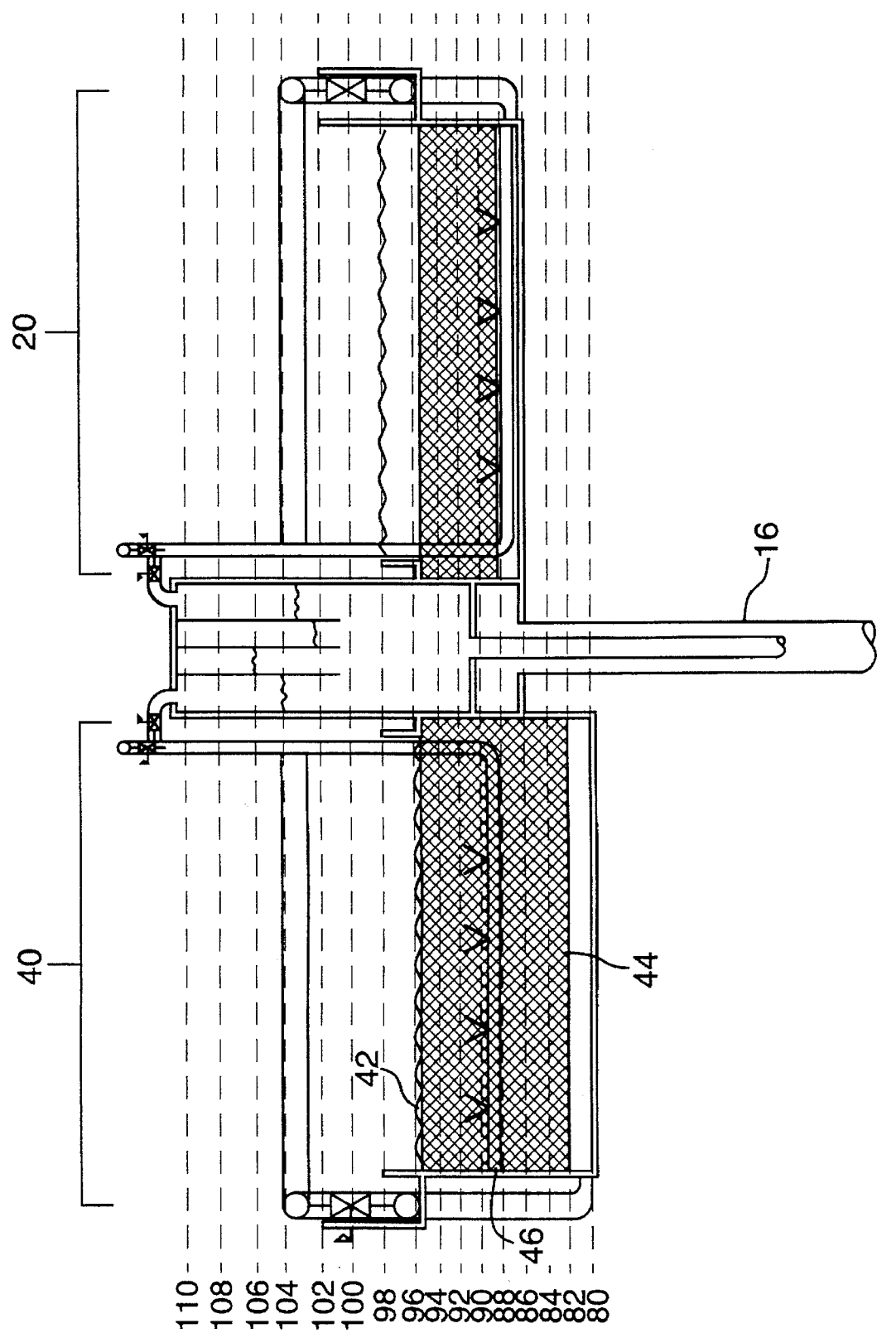
FIG. 4 is a diagrammatic vertical section through FIG. 3.

With reference to FIGS. 3 and 4, if it is necessary to achieve a very high purity effluent with essentially no residual BOD, TSS, total nitrogen or total phosphorous, an alternate deep bed biofilter configuration 40 may be constructed with an aerobic top portion 42 and an anoxic bottom portion 44. Aeration provided by the head tank off-gas is injected into the filter at the inter-face between the two zones 46, and residual nitrate is de-nitrified anoxically on the lower portion of the filter using, if required, methanol or other suitable carbon source. The lower portion of the filter is up-flow backwashed with the same backwash water and at the same time as the top portion of the filter, but without air scour in the lower portion. Air scour of the anoxic portion may damage the bio-mass. Effluent under the deep bed filter may flow by gravity for re-aeration as required.

By providing an alternate configuration of a storm flow by-pass to the biofilters, the vertical shaft and flotation clarifiers will not experience large flow changes that would impact negatively on their performance. Additionally, since the bio-filter is an attached growth system, the bio-solids will not wash out even with large flows. Wash out is a common failure with activated sludge plants under severe hydraulic flows. Storm flows tend to be weak in organic matter and can be treated by the bio-filters, but they carry high levels of dissolved oxygen which would impact negatively on the denitrification tank if the storm flow were allowed to flow to denitrification.

Periodic air scour and backwash for cleansing of nitrifying bio-filters 20 is achieved by utilizing vertical shaft off-gas 22 and clarified effluent 34 from flotation clarifier 18 with the resulting backwash and bio-solids effluent recycling to vertical shaft 16 through backwash recycle line 36. Polishing filters 26 and 28 may be periodically backwashed utilizing clarified effluent from final clarifier 24, which is stored in holding tank 38. Backwash pressure is acquired by pressurizing holding tank 38 by either placing the tank at appropriate elevation to achieve hydraulic head, utilizing a stand alone pumping system, or applying compressed air to the tank to put the clarified backwash water under pressure. Since polishing filter 28 is anoxic, no air scour is used through that filter. Filter 26 however is aerobic, and air scour may be achieved by using high pressure air from compressor 16A. Backwash recycle effluent may then be recycled back to vertical shaft 16 through backwash recycle line 36.

Where physical-chemical phosphorous removal techniques are preferred over biological phosphorous removal herein described, an alternate embodiment of the invention has the anaerobic fermentation and treatment tanks 10 and 12 removed from the system. Lime, alum, or iron salts 18A may then be added to the liquor flow after vertical shaft treatment 16, thereby precipitating phosphorous in the sludge blanket of first clairifer 18, which can then be wasted. Lime raises the pH which suppresses $CO_2$ production, although $CO_2$ is an aid to flotation.

The nutrient removal polishing and refractory treatment stages 26, 28, 30, and 32 enable the clarified effluent to achieve very high standards of quality, such as is set forth in California Title 22 Guidelines. However, if the effluent quality required is less than the most stringent of guidelines, a further embodiment of the invention has process steps 26, 28, 30 and 32 removed from the process flowsheet. Other embodiments can remove both the biological phosphorous steps at 10 and 12 and the polishing steps 26, 28, 30 and 32, depending upon the particular process and effluent quality requirements.

It is to be understood that modifications to the embodiments of the invention described and illustrated herein can be made without departing from the scope and spirit of the invention as defined in the appended claims.

I claim:

1. A method of treating municipal or industrial wastewater containing undesired concentrations of ammonium or nitrate ions, said method comprising (a) treating said wastewater under anoxic, denitrifying conditions with denitrifying bacteria to reduce the concentration of nitrate ion and produce nitrogen gas and a denitrified liquor;

(b) treating said denitrified liquor in an aerobic vertical shaft bioreactor with an oxygen-containing gas to effect BOD removal by the bioxidation of organic compounds in said denitrified liquor and produce carbon dioxide off-gas and a shaft bioreactor effluent liquor; clarifying a first portion of said shaft bioreactor effluent liquor to provide a first clarified liquor and a second portion of said shaft bioreactor effluent liquor to provide a second clarified liquor;

(c) treating said first clarified liquor under aerobic nitrifying conditions with nitrifying bacteria, an oxygen-containing gas and said off-gas to oxidize ammonium ion to nitrate ion and provide a first nitrified liquor;

(d) recycling by adding said first nitrified liquor to said wastewater under step (a);

(e) treating said second clarified liquor under aerobic, nitrifying conditions with nitrifying bacteria, an oxygen-containing gas to oxidize ammonium ion to nitrate ion and provide a second nitrified liquor;

(f) removing said second nitrified liquor as plant effluent.

2. A process as defined in claim 1 further comprising treating raw wastewater influent under anaerobic fermentation conditions with volatile fatty acid-forming bacteria to produce a volatile fatty acid-containing liquor;

treating said volatile fatty acid-containing liquor with phosphate-fixing bacteria to provide a phosphate-fixed liquor; and treating said phosphate-fixed liquor under step (a).

3. A process as defined in claim 2 further comprising feeding a second portion of said activated sludge as returns activated sludge to said anaerobic fermentation conditions under step (g).

4. A process as defined in claim 1 further comprising removing as plant effluent liquor a portion of said clarified liquor selected from said first clarified liquor and said second clarified liquor.

5. A process as defined in claim 1 further comprising feeding a first portion of said activated sludge as returns activated sludge to said anoxic, denitrifying conditions under step (a).

* * * * *